Jan. 22, 1952  H. MUELLER  2,583,186
METHOD OF DETERMINING THE POLARIZATION
OF A LIGHT BEAM

Filed Nov. 19, 1949  2 SHEETS—SHEET 1

Inventor.
Hans Mueller
by Kenway Jenney Witter
& Hildreth
Attys.

Patented Jan. 22, 1952

2,583,186

UNITED STATES PATENT OFFICE 2,583,186

METHOD OF DETERMINING THE POLARIZATION OF A LIGHT BEAM

Hans Mueller, Cambridge, Mass., assignor, by mesne assignments, to Research Corporation, New York, N. Y., a corporation of New York Application November 19, 1949, Serial No. 128,407

2 Claims. (Cl. 88—14)

The present invention relates to methods and apparatus for the analysis of light, and more particularly for the analysis of partially polarized light. Such apparatus is useful in various applications; for example, in the determination of the particle size distribution of a polydisperse smoke, as will be explained hereinafter.

The term "partially polarized light" refers to light which is neither polarized nor natural. Polarized light is light which has specific transverse properties. There is a variety of variously polarized light beams, which can be categorized as "plane polarized," "circularly polarized," or "elliptically polarized." Natural light is a random mixture of all these various types. A mixture of polarized components which is not completely random is known as "partially polarized" light. The various types of light can be considered as a continuum, with natural light at one extreme and polarized light at the other, and with partially polarzied light of varying degrees of polarization lying in between. The "degree of depolarization" of light beam is an index of its location in the continuum.

The object of the present invention is to provide a system which, by means of simple measurements and calculations, will determine whether a light beam is natural, polarized, or partially polarized; and, if the latter, will give a measure of the degree of polarization. With this object in view the present invention comprises the apparatus hereinafter described, and more particularly defined in the claims.

Figure 1:
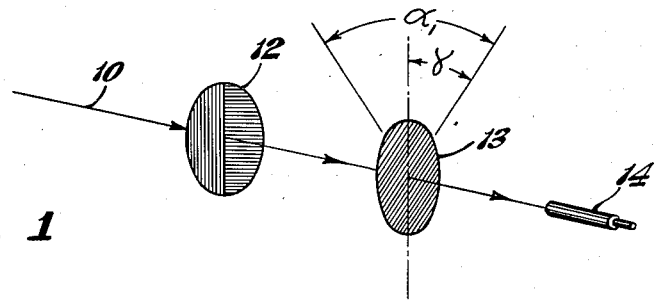
Figure 2:
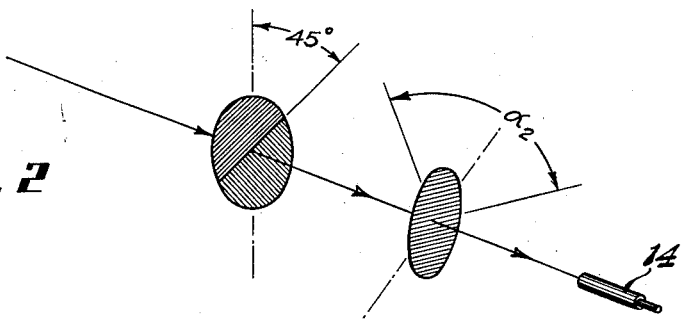
Figure 3:
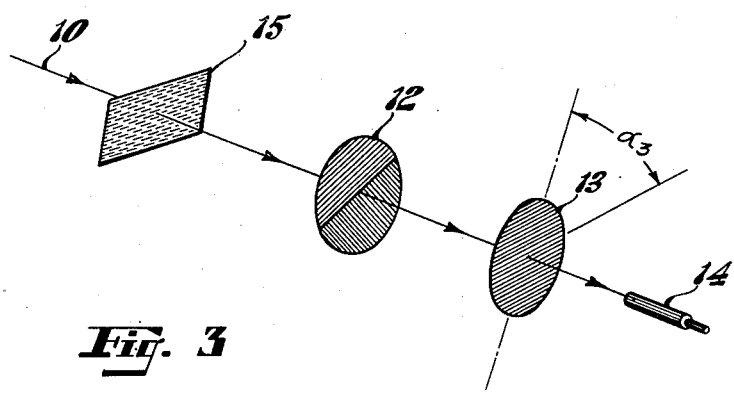
Figure 4:
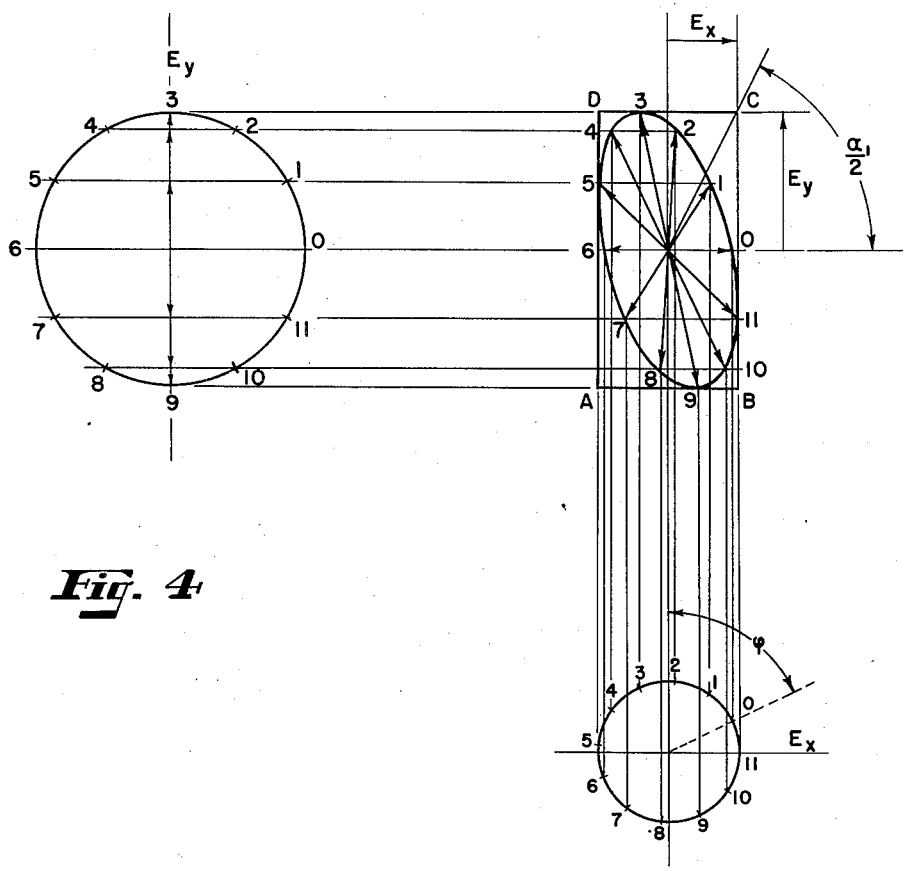
Figure 5:
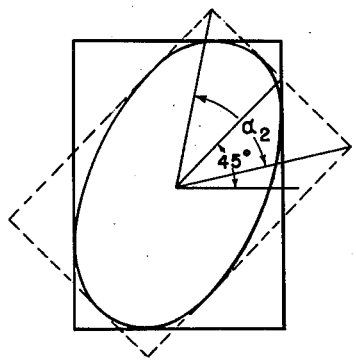

In the accompanying diagrams, Figs. 1 and 2 are diagrams of the apparatus used in making part of the required measurements; Fig. 3 is a diagram of the apparatus used in making another of the required measurements; and Figs. 4 and 5 are diagrams to explain the operation of the present invention.

In Fig. 1 the arrow 10 represents a light beam to be analyzed. The beam will usually, though not necessarily, be monochromatic. The light first passes through a bi-polarizer 12. This can be a Wollaston-, Rochon-, or Senarmont-prism, or a Polaroid bipartite plate (also called a split field Polaroid). The bi-polarizer splits the light beam into two plane polarized fields oriented at right angles to each other. The line separating the fields is conveniently referred to as the axis of the bi-polarizer. The light then passes through the analyzer 13, which may be a Nicol prism or a Polaroid plate. It then passes into the telescope 14.

As shown in Fig. 3, a quarter-wave plate 15 is, for certain purposes, introduced ahead of the bi-polarizer.

In the operation of the present invention, only three simple angular measurements are required.

In the first measurement, the axis of the bi-polarizer is in a certain position, conveniently shown vertical. Looked at through the telescope 14, the two halves of the bi-polarizer appear, in general, to be of unequal brightness. The operator rotates the analyzer 13 until both sections of the bi-polarizer appear to be equally bright. There are two positions of the analyzer in which this condition is fulfilled. The operator determines these two positions and measures the angle of rotation between them. This angle will be referred to as $a_1$.

To perform the second measurement, as shown in Fig. 2, the operator turns the bi-polarizer 12 through an angle of 45° in either direction from the vertical. He then rotates the analyzer as before to determine the two positions in which the sections of the bi-polarizer appear to be equally bright, and measures the angle between these two positions. This angle will be referred to as $a_2$.

For the third measurement the quarter-wave plate 15 with its axis horizontal is inserted ahead of the bi-polarizer and analyzer, as in Fig. 3. The axis of the bi-polarizer 12 is set at the same position as in the second measurement. The analyzer 13 is rotated as in the first two measurements, and the angle between the two positions of equal brightness is measured. This angle will be referred to as $a_3$.

The three angles thus measured are enough to determine whether the light is polarized, partially polarized or natural, according to the following simple rule: Compute the sum $\cos^2 a_1 + \cos^2 a_2 + \cos^2 a_3$. If this sum has the value 1 the light is totally polarized; if it is smaller than 1 the light is partially polarized; and if it is zero the light is natural. The deviation of the sum from 1 is a measure of the degree of "depolarization" of the light.

The operation of the present invention may be most readily explained by a consideration of the two limiting cases—natural light and polarized light.

The case of natural light is relatively simple. Since it has no specific transverse properties, the light passed through the two fields of the bi-polarizer will be equal in intensity, for each of the three measurements. As viewed through the telescope the two areas will appear equally bright when the axis of the analyzer makes a 45° angle with the axis of the bi-polarizer. There are obviously two positions of the analyzer in which this condition is fulfilled, and the angle between them is 90°. All three angles—$\alpha_1$, $\alpha_2$, $\alpha_3$—are therefore 90°. The sum $\cos \alpha_1{}^2 + \cos \alpha_2{}^2 + \cos \alpha_3{}^2$ is, of course, zero.

The case of polarized light is more complex. The polarized beam can be considered in terms of its electric vector, which vibrates in the plane of the wave front. This vector can be resolved, in turn, into two components, a horizontal component ($E_x$) and a vertical component ($E_y$).

In the case of monochromatic light, these vary sinusoidally. The frequencies of the two sinusoids are the same, but their magnitudes are in general different; and there is generally a phase difference, which is represented by the phase angle $\phi$.

This analysis is shown diagrammatically in Fig. 4. The vectors $E_y$ and $E_x$ are represented by circles whose radii correspond to the magnitudes of the vectors. The instantaneous value of each vector is represented by the projection on the diameter of its circle of a point moving with constant velocity around the circumference. The Figures 1, 2, 3, ... around each circle represent corresponding positions of the moving points. The difference in phase is shown by the fact that the numbers on one circle are offset by the angle $\phi$ from the numbers on the other circle.

The combination of $E_x$ and $E_y$ usually gives an ellipse, as shown in Fig. 4. When the phase angle is zero or 180°, the ellipse degenerates into a straight line. This represents a plane polarized beam. If the phase angle is 90°, and $E_x = E_y$, the ellipse becomes a circle. This represents a circularly polarized beam.

If a bi-polarizer with its axis vertical is placed in the path of the light beam represented by Fig. 4, the beam is split into two fields, one vertically polarized, and the other horizontally polarized. The intensities of the two portions are, respectively, $E_y{}^2$ and $E_x{}^2$. When viewed through the analyzer, these intensities are reduced by the factors $\cos^2 \gamma$ and $\sin^2 \gamma$ respectively, where $\gamma$ represents the angle between the transmission direction of the analyzer and the vertical. The two fields of the bi-polarizer will appear equally bright for two angles $\gamma$. These angles are of equal magnitude but opposite sign. Thus $2\gamma = \alpha_1$. Then $$E_x{}^2 \sin^2 \gamma = E_y{}^2 \cos^2 \gamma$$

from which $$\tan \gamma = \tan \frac{1}{2}\alpha_1 = \frac{E_y}{E_x} \qquad (1)$$

and $$\cos \alpha_1 = \frac{E_y{}^2 - E_x{}^2}{E_y{}^2 + E_x{}^2} \qquad (2)$$

From the last equation, the geometric significance of $\alpha_1$ is apparent. It is the angle between the diagonals of the rectangle ABCD in Fig. 4, having horizontal and vertical sides tangent to the ellipse. This result permits an interpretation of the angle $\alpha_2$, obtained with the bi-polarizer at a 45° angle from the vertical. Since a rotation of the bi-polarizer means simply a rotation of the reference axes, $\alpha_2$ must be the angle between the diagonals of a rectangle whose sides are tangent to the ellipse and parallel to the +45° and −45° directions. The geometrical construction leading to $\alpha_2$ is shown in Fig. 5. It shows that for plane polarized light, for which $\phi = 0$, $\alpha_2$ is complementary to $\alpha_1$. In the other limiting case, when $\phi = 90°$, the rectangle becomes a square, whence $\alpha_2 = 90°$. Thus it is realized that $\alpha_2$ depends not only on $E_x$ and $E_y$, but also on $\phi$; and the two limiting cases suggest that $\cos \alpha_2$ is proportional to $\cos \phi$. A simple computation shows indeed the validity of the equation $$\cos \alpha_2 = \frac{2 E_x E_y}{E_x{}^2 + E_y{}^2} \cos \phi \qquad (3)$$

To explain the significance of $\alpha_3$ the action of the quarterwave plate must first be explained. This may be a plate of mica of definite thickness or, more conveniently, a sheet of plastic material which has been stretched or rolled, with the result that plane polarized light with its electric vector along the direction of stretch travels with a different speed through the sheet from light with the vector normal to the stretch. Hence the $E_x$ and $E_y$ components of any beam change their phase difference during passage through the sheet. Thus the plate may be generally termed a phase-displacing device. The thickness of the sheet and the stretch are adjusted to give a 90° shift of phase. Since in the $\alpha_3$ determination the bi-polarizer has the same orientation as for the $\alpha_2$ measurements, $\alpha_3$ is given by the same formula as $\alpha_2$ if $(\phi + 90°)$ is substituted for $\phi$. Hence $$\cos \alpha_3 = \frac{2 E_x \times E_y}{E_x{}^2 + E_y{}^2} \sin \phi \qquad (4)$$

Since the values of $\cos \alpha_1$, $\cos \alpha_2$ and $\cos \alpha_3$ have been calculated, the sum $\cos^2 \alpha_1 + \cos^2 \alpha_2 + \cos^2 \alpha_3$ can now be determined. By squaring and adding (2), (3) and (4), it is readily seen that $$\cos^2 \alpha_1 + \cos^2 \alpha_2 + \cos^2 \alpha_3 = 1 \qquad (5)$$

Therefore, for polarized light the sum of the squares of the three cosines is unity. In such a case the measurement not only shows that all the light is polarized but gives all necessary information as to the character of polarization. This can be done in terms of the so-called Stokes parameters. Let $I$ represent the total intensity of the light, and let $$M = I \cos \alpha_1 = E_y{}^2 - E_x{}^2$$
$$F = I \cos \alpha_2 = 2 E_x E_y \cos \phi$$
$$S = I \cos \alpha_3 = 2 E_x E_y \sin \phi$$

The total intensity $I$ may be determined by a photometric measurement, but such a measurement is unnecessary if only the state of polarization is required, since the ratios $M/I$, $F/I$ and $S/I$ are then sufficient. If it is desired to solve for the parameters associated with elliptical polarization, the above equations can be solved for the ratio $E_y/E_x$ and the phase angle $\phi$. Furthermore since elliptically polarized light may be considered as made up of plane polarized and circularly polarized components, the components themselves may be obtained in a manner which requires no explanation here but will be clear to those skilled in this art.

It has thus been shown that for naural light $$\cos^2 \alpha_1 + \cos^2 \alpha_2 + \cos^2 \alpha_3 = 0$$

or $$M^2 + F^2 + S^2 = 0$$

while for totally polarized light $$\cos^2 \alpha_1 + \cos^2 \alpha_2 + \cos^2 \alpha_3 = 1$$

or $$M^2 + F^2 + S^2 = I^2$$

Since these are the two possible extremes, a measurement on "partially polarized" light, i. e., a mixture of natural and polarized light, will give a result in which the sum of the squares of the cosines will be between zero and one. The deviation of the sum from one is then a measure of the "depolarization" of the light. In any event, the four Stokes parameters I, M, F and S serve to characterize the light completely. (As in the special cases above described, it is not usually necessary to know the actual magnitudes of these intensities since the quantities $M/I$, $F/I$ and $S/I$ as given directly by the measurements, will suffice. These quantities may be termed the "relative intensities" or "relative Stokes parameters.")

From the parameters I, M, F, S, it is possible to determine the intensities of the separate components. In other words, it is possible to determine the relative intensity of "natural" light, and the remainder will be elliptically polarized light of certain eccentricity and phase; then if desired the elliptically polarized light may be resolved into its linear and circular components. The relations among these various quantities, however, are not simple in the case of partially polarized light, nor is it usually necessary to effect a resolution of intensities into natural and polarized components, since a knowledge of the Stokes parameters M, F and S in relation to the total intensity I will suffice for most purposes. In any event, the measurement of the Stokes parameters according to the present invention provides all necessary information as to the state of polarization of the light.

The importance of the Stokes parameters arise mainly from the fact that if a light beam with parameters I, M, F, S is incident on any kind of optical instrument which transmits, reflects or scatters the light, the Stokes components I', M', F', S' of any beam emitted therefrom are given by linear functions of the Stokes components of the incident beam. If, therefore, the beams incident on and emitted from a certain instrument are measured, information as to the character of the instrument may be obtained; for example, tempered glass, because of certain anisotropic characteristics, converts a polarized beam into a partially polarized beam, and measurements of the beams may be utilized to determine the effectiveness of the tempering. As another example, the scattering of light by particles suspended in a liquid or a gas may be considered. Polarized light is to some extent depolarized by the scattering effect of polydisperse suspensions, and the Stokes parameters of the beams emitted in various directions are significant in determining the size and distribution of the particles.

By utilizing the precise sequence of steps described herein, the results are attained directly in terms of the Stokes parameters. In general, however, the exact angles described above are not necessary. Thus, after measuring $a_1$ with the axis of plate 12 vertical, it is not essential to set the axis of plate 12 to exactly 45° for the second step. Any angle B, not necessarily 45°, will serve. Also, for the third step, the plate 12 may be set at any angle C, and the quarter-wave plate at any angle D. From these values and the measured $a$-values, the Stokes parameters may be derived, or the $a$-values themselves may be considered determinative. It will be understood that there may be certain "degenerate" values of B, C and D which will not give enough independent equations to solve for the necessary parameters, but in general, any values of these angles may be used to provide a complete determination of the state of polarization of the light.

In the practice of the invention, substantially monochromatic light will ordinarily be used, especially in experiments on scattering which depends on the wavelength. However, so far as the procedure of measurement is concerned, it is not limited to monochromatic light, but may be carried out with polychromatic light within the range of achromatism of the parts of the equipment. In this respect, the quarter-wave plate 15 is usually the limiting factor, although such plates are available which are achromatic over a substantial portion of the spectrum.

The present invention therefore provides a simple and easily operated method and apparatus for completely determining the state of polarization of any light beam, whether natural, or partially or completely polarized.

Having thus described the invention, I claim:

1. The method of determining the state of polarization of a beam of light which comprises bi-polarizing the light beam to obtain two plane-polarized fields having their axes of polarization at an angle to each other, passing the bi-polarized beam through an analyzer, rotating the analyzer to determine two positions in each of which the fields appear of equal intensities and measuring the angle between said two positions, setting the axis of bi-polarization at a determinate angle from its initial position, again rotating the analyzer and measuring the angle between the two positions in which the fields appear of equal intensities, introducing a phase-displacing device, and again rotating the analyzer and measuring the angle between the two positions in which the fields appear of equal intensities, whereby the state of polarization is determined from the angles thus measured.

2. The method of determining the state of polarization of a beam of light which comprises introducing a bi-polarizer into the path of the light beam to obtain two plane-polarized fields having their axes of polarization at right angles to each other, passing the bi-polarized beam through an analyzer, rotating the analyzer to determine two positions in each of which the fields appear of equal intensities and measuring the angle between said two positions, setting the axis of bi-polarization at an angle of 45 degrees from its initial position, again rotating the analyzer and measuring the angle between the two positions in which the fields appear of equal intensities, introducing a phase-displacing device while maintaining said bi-polarizer with its axis at said 45 degrees angle from its initial position, and again rotating the analyzer and measuring the angle between the two positions in which the fields appear of equal intensities, whereby the state of polarization is determined from the angles thus measured.

HANS MUELLER.

REFERENCES CITED

The following references are of record in the file of this patent:

"Theory of Light," by T. Preston, published by MacMillan & Co., London, second edition, 1895, pages 44, 296, 299, 403–418.

"Principles of Optics," by A. C. Hardy et al., published by McGraw-Hill Book Co., New York, first edition, 1932, pages 595–618.